UNITED STATES PATENT OFFICE.

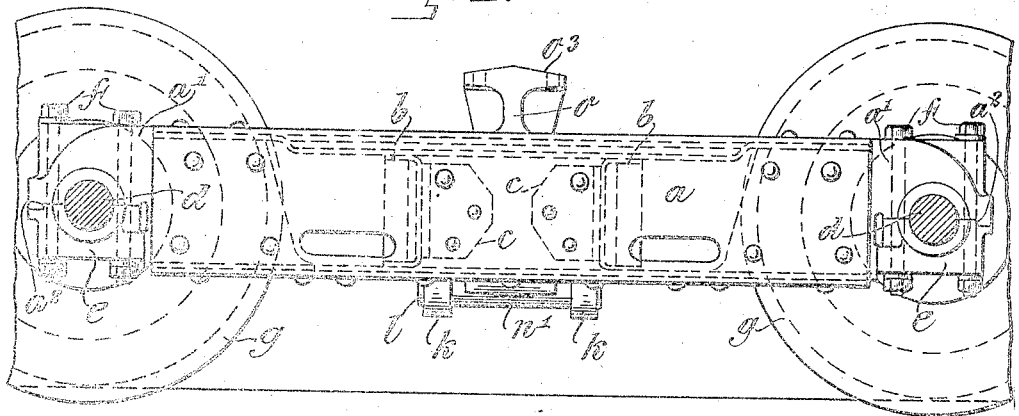
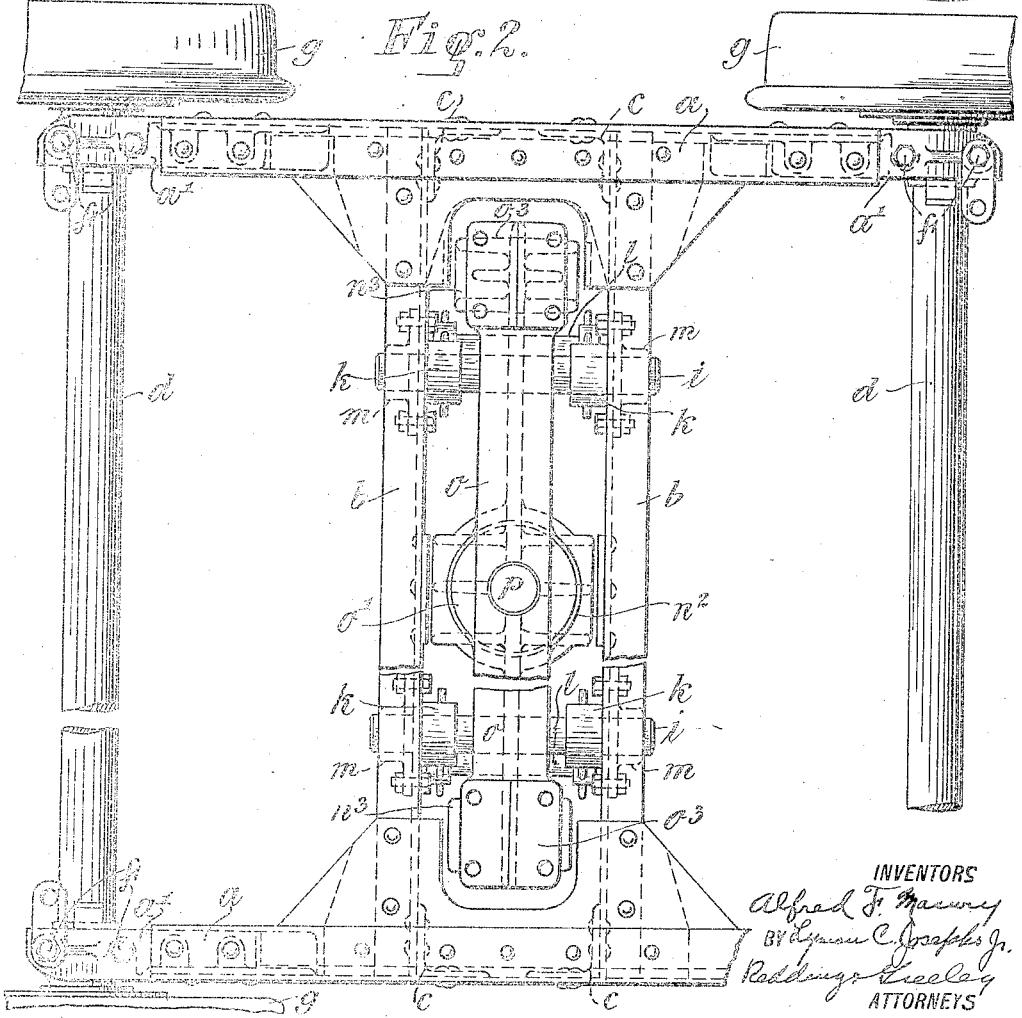

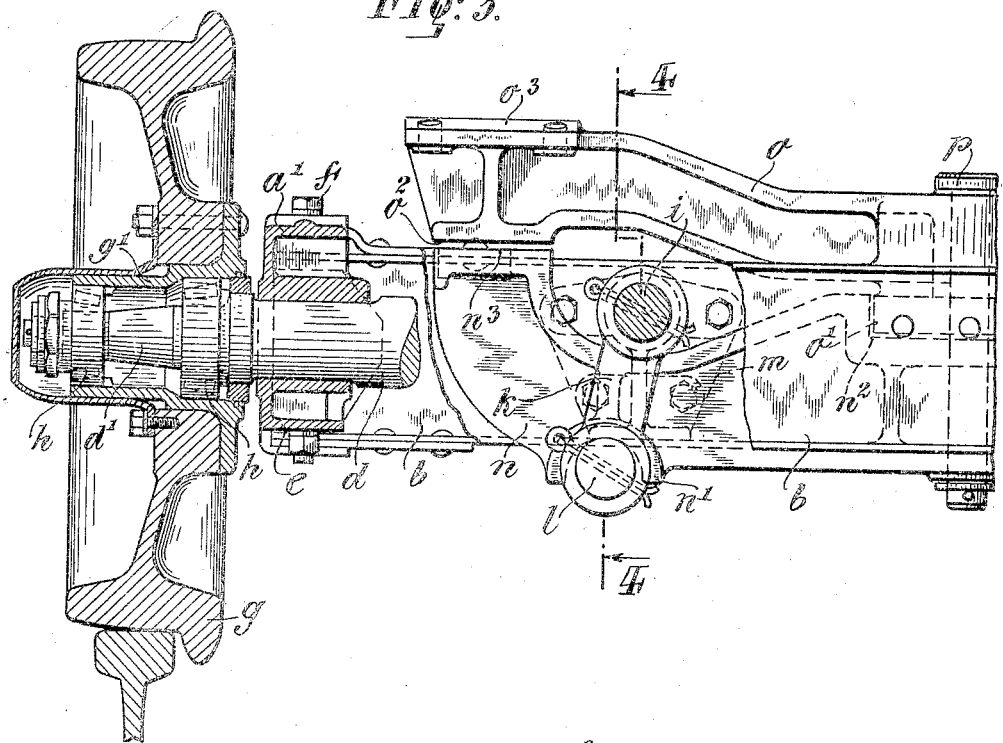
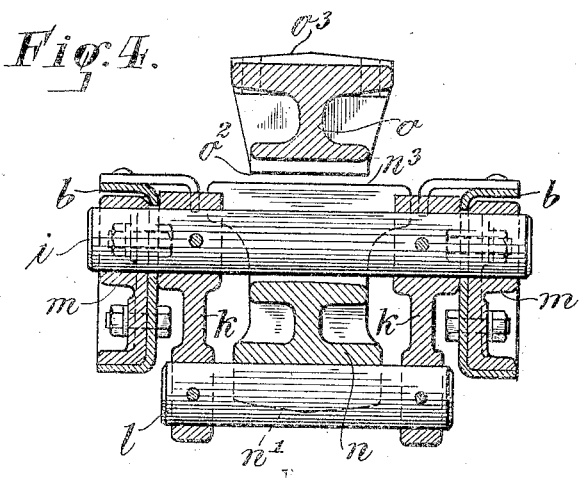

ALFRED F. MASURY, OF NEW YORK, N. Y., AND LYMAN C. JOSEPHS, JR., OF ALLENTOWN, PENNSYLVANIA, ASSIGNORS TO INTERNATIONAL MOTOR COMPANY, OF NEW YORK, N. Y., A CORPORATION OF DELAWARE.

LEADING TRUCK FOR RAILWAY MOTOR CARS.

1,423,238.  Specification of Letters Patent.  Patented July 18, 1922.

Application filed December 31, 1921. Serial No. 526,164.

*To all whom it may concern:*

Be it known that we, ALFRED F. MASURY and LYMAN C. JOSEPHS, Jr., citizens of the United States, and residing, respectively, in the borough of Manhattan of the city of New York, in the State of New York, and in the city of Allentown, in the county of Lehigh and State of Pennsylvania, have invented certain new and useful Improvements in Leading Trucks for Railway Motor Cars, of which the following is a specification, reference being had to the accompanying drawings, forming a part hereof.

The principal problem in the development of railway cars propelled by internal combustion motors is the adaptation of automotive vehicles of standard design to railway practise and the satisfying of railway requirements without sacrificing to an undue extent the conventional standards now commonly in vogue in the automotive art. The present invention has to do with a leading truck for use in the support of the front end of the chassis of an automotive vehicle adapted to be operated on rails. It is the principal object of the invention to provide a truck for the purpose described which shall be of simple and sufficiently rugged construction without being of undue weight, and shall embody the best practice in both the railway and the automotive art. More particularly, the invention has for its object to provide an improved swinging bolster for the support of the vehicle springs which, itself, is supported from the railway truck by devices which give the necessary degree of flexibility while automatically dampening undue oscillations and effectively resisting side sway. A further object of the invention is to provide an imroved bearing for the axles which bearing may be readily assembled and disassembled and when assembled, will offer maximum resistance to separation and transmit driving thrust to the axles with a minimum amount of shearing stresses on the retaining bolts. A further object of the invention is to provide in a leading truck for the purpose described an improved mounting for the flanged wheels on the axles, the invention contemplating the provision of independent wheel bearings on the axle so that the wheels will revolve thereabout.

These and other objects will appear more particularly hereinafter in the description given with reference to the preferred embodiment illustated in the drawings, wherein—

Figure 1 is a view in side elevation of the improved truck.

Figure 2 is a view in plan thereof.

Figure 3 is a detail view on a somewhat larger scale partly in section and partly in elevation and taken transversely of the truck through one of the wheels, the axle being broken away in the interest of clearness.

Figure 4 is a detail view in section showing the means for supporting the swinging bolster and taken along the plane indicated by the line 4—4 of Figure 3 and looking in the direction of the arrows.

The improved truck is composed generally of side frame members $a$ which may be formed of channel members united rigidly by transverse transoms $b$ which may also be of channel form and united to the side frame members, as by means of angle pieces $c$. In the side frame members $a$, at the ends thereof, may be supported the split bearings $a'$ for the axles $d$, these bearings being split along the horizontal diameter of the axles and being closed by caps $e$ which are bolted thereto by through bolts $f$. The bearings at opposite ends of the side frame members are shouldered, as at $a^2$, and the bearing caps $e$ are correspondingly shouldered to conform thereto, the shoulders of the bearings on the same side of the truck being in opposed relationship, as it were, that is, at opposite sides of their respective axles, so that the driving thrust will be transmitted through its shoulder to its axle when the truck is moving in one direction and the driving thrust of the other shoulder will be transmitted to its axle when the truck is moving in the opposite direction. The effect of these shoulders is, as will be evident, to relieve the bolts $f$ of the shearing stresses which would be imposed on them by split bearings parted along the diameter of the axles. Further, the shoulders tend to hold the bearings in assembled relation against separating strains.

In Figure 3 there is shown particularly the improved means for mounting the flanged wheels $g$, these means conforming to automotive practise rather than to railway practise. As shown therein, the axle $d$ has on its spindle $d'$ roller bearings $h$ which are disposed generally at opposite sides of the load plane and rest within the hub $g'$ of the wheel $g$. In this way, it will be evident that the wheel revolves freely on these bearings which are carried by the axle. In railway practise it is usual to have the wheels revolve with the axles and secured thereto.

One of the principal features of the invention has to do with the swinging bolster on which the vehicle springs are supported. In railway practise the springs are usually interposed between the journal boxes and the bolster and the car frame rests directly on the bolsters. In the improved construction, however, the vehicle springs themselves will constitute the only resilient elements between the car wheels and the frame of the vehicle and these springs rest on the improved bolster although the latter has no resilient connection with the axles. It is proposed, however, to mount the bolster in such manner that it will have the necessary degree of flexibility to minimize the stresses impressed thereon, particularly on curves, and yet resist effectively side sway and dampen automatically oscillations. As shown, the transom channels $b$ have supported therebetween pins $i$ on which are carried between the transoms depending links $k$. These links, in turn, carry at their lower ends a transverse pin $l$. The construction just described is duplicated at opposite sides of the single truck, two such pins $i$ and sets of links being mounted between the transoms. If desired, reinforcing plates and bearings $m$ for the pins may be bolted in the transom channels $b$, as shown. The swinging bolster itself comprises generally a lower bolster $n$ which is generally I-shaped in cross section, as shown in Figure 4, and an upper bolster $o$ which may be of similar cross section and rest at its center on the lower bolster $n$. The bolster $n$ has adjacent its opposite ends semicircular bearing seats $n'$ which seat on the pins $l$. These bearing seats $n'$ are so placed with respect to one another that when the lower bolster $n$ is mounted on its supporting pins $l$ the swinging links $k$ will be held out of the vertical and mutually oppose side sway. This is indicated clearly in Figure 3. For convenience, the lower bolster $n$ may be recessed adjacent its midsection, as indicated in dotted lines at $n^2$ in Figure 3, to receive somewhat loosely a bearing trunnion $o'$ formed on the underside of the upper bolster $o$ adjacent its midsection. A king pin $p$ passes through the bolsters and secures them together with capacity for limited swiveling movement. The outer ends of the lower bolster member $n$ terminate in seats or bearing surfaces $n^3$ remote from the king bolt $p$, while the undersides of the outer ends of the upper bolster $o$ terminate in opposed seats or bearing surfaces $o^2$ lying directly over the first named seats $n^3$ and separated therefrom by a short distance so that when the upper bolster rocks on the lower bolster its movement will be limited by engagement of said seats $n^3$, $o^2$. The upper sides of the outer ends of the upper bolster $o$ are formed as spring seats $o^3$ to which the vehicle springs are secured in accordance with approved automotive practise.

In the construction the weight of the vehicle frame will be carried on the swinging bolster which in turn is supported by the swinging links $k$. The links at opposite sides of the king pin $p$ will hang in inclined position, their lower ends being spread by the lower bolster $n$ in the manner described. Side sway of the bolster by reason of this relation of the links will be opposed by gravity and these links will mutually react so as to tend to dampen oscillations of the vehicle frame from side to side. The stresses on the bolster will be minimized to the usual degree by the limited swiveling movement afforded between the upper bolster $o$ and the lower bolster $n$. The entire construction is simple, light, rugged, accessible an effective for the purposes intended. Changes in matters of form, design, relation and arrangement may be made without departing from the spirit of the invention provided the general combination of parts set out in the accompanying claims is employed.

We claim as our invention:

1. A leading truck for self-propelled railway cars comprising side frame members having bearings at their opposite ends for engagement with the axles, transverse transoms extending between the side frame intermediate the axles and secured at their opposite ends to the side frame members, pins supported in said transoms at opposite sides of their mid-section and a bolster supported swingingly on said pins and having seats for the vehicle springs.

2. A four-wheeled leading truck for self-propelled railway cars comprising side channel members, a bearing for the axle supported within the channels at opposite ends thereof, transverse transoms formed as channel members extending between the side frame members intermediate the axles, angle pieces to secure said transoms to the side channels, reinforcing bearing plates secured within the channels of the transoms at opposite sides of the midsections, pins extending through the transoms and said bearing plates and a bolster mounted swingingly on said pins and having seats for the vehicle springs.

3. In a leading truck for self-propelled railway cars, swinging links mounted on the truck, a lower bolster mounted freely on the links to swing therewith, and an upper bolster mounted centrally of the lower bolster with capacity for swiveling movement with respect thereto and having seats thereon for the vehicle springs.

4. In a leading truck for self-propelled railway cars, pins mounted on the truck at opposite sides of the center line thereof, depending links carried on the pins, separate pins connecting the links at their lower ends, and a swinging bolster extending between said last named pins transversely of the truck and having open bearing seats formed therein to rest on said last named pins, said bearing seats being spaced apart a distance greater than the distance between the centers of said pins whereby the lower ends of the links are spread apart and side sway of the bolster is resisted.

5. In a leading truck for self-propelled railway cars, transverse transoms, pins mounted therein at opposite sides of the midsections, links depending from said pins, other pins between the lower ends of said links, a swinging bolster having open curved bearing seats adjacent opposite ends thereof to seat on the pins at the lower ends of the links and hold the links normally out of the vertical, an upper bolster mounted pivotally on the lower bolster adjacent the midsection with capacity for swiveling movement therebetween, and bearing surfaces on said bolsters to co-operate to limit relative angular movement therebetween.

This specification signed this 28th and 29th days of December, A. D. 1921.

ALFRED F. MASURY.
LYMAN C. JOSEPHS, Jr.